United States Patent [19]

Pickstone

[11] 3,869,989

[45] Mar. 11, 1975

[54] CONVEYOR

[75] Inventor: William Frank Pickstone, Halesowen, England

[73] Assignee: Redman Fisher Engineering Limited, Tipton, Stafford, England

[22] Filed: Dec. 28, 1973

[21] Appl. No.: 429,639

[30] Foreign Application Priority Data

Mar. 30, 1973 Great Britain.................. 15537/73

[52] U.S. Cl. ............... 104/94, 104/106, 104/172 S
[51] Int. Cl. ............................................... B61b 3/00
[58] Field of Search ......... 104/94, 95, 89, 106, 108, 104/139, 172 R, 172 S

[56] References Cited
UNITED STATES PATENTS

| | | | |
|---|---|---|---|
| 1,372,761 | 3/1921 | McBride | 104/172 S |
| 2,922,183 | 1/1960 | Taylor | 104/94 X |
| 3,033,128 | 5/1962 | Czarnecki | 104/94 X |
| 3,602,150 | 8/1971 | Frost et al | 104/94 X |

*Primary Examiner*—Lloyd L. King
*Assistant Examiner*—Randolph A. Reese
*Attorney, Agent, or Firm*—Spencer & Kaye

[57] ABSTRACT

A trolley for use on a conveyor track having two channel section portions arranged with their mouths facing towards one another has two pairs of load bearing wheels mounted on respective ones of a pair of carriers. The carriers are received in respective slots formed in a body of the trolley, these slots having open mouths which face along the track so that the carriers can be withdrawn from the body while the load bearing wheels remain in engagement with the track. The carriers, with the load bearing wheels still mounted thereon, can then be withdrawn from the track through a gap between the channel section portions.

4 Claims, 3 Drawing Figures

CONVEYOR

BACKGROUND OF THE INVENTION.

The invention relates to a conveyor of the kind comprising a track having two channel section portions which extend side-by-side with their open mouths presented towards each other and a trolley having a body and at least one pair of load bearing wheels which run inside the channel section portions of the track and support the body from the track.

In a conveyor of the kind referred to, the load bearing wheels of the trolley are normally enclosed above, below and at their laterally outer sides by the track. Inspection of the load bearing wheels is difficult, especially in cases where there is only a narrow gap between the channel section portions of the track. Furthermore, with known trolleys the load bearing wheels cannot be simply dismounted from the body whilst the latter is situated between the channel section portions of the track and it is necessary, in order that the load bearing wheels may be replaced, serviced or conveniently inspected, either to move the trolley to a special service section of the track or completely to dismantle the trolley whilst it is in the track.

It is an object of the invention to provide in a conveyor of the kind referred to a trolley whereof the load bearing wheels can be inspected or replaced more conveniently than can the load bearing wheels in known conveyors of the kind referred to.

SUMMARY OF THE INVENTION.

According to the invention, the trolley comprises carrier means on which the load bearing wheels are mounted for rotation relative thereto about respective axes, the carrier means and the body are provided with mutually-co-operating positioning means for guiding the carrier means in a direction transverse to the axis of one of said load bearing wheels to a predetermined position relative to the body and releasable retaining means is provided for restraining movement of the carrier means relative to the body from said predetermined position.

With this arrangement, when the carrier means is released from the body, the carrier means with the load bearings wheels mounted thereon can be moved relative to the body in a direction transverse to the axis of the load bearing wheels out of assembled relation with the body. Thus, the carrier means and load bearing wheels can be dis-assembled from the body while the load bearing wheels remain in engagement with the track.

DESCRIPTION OF THE PREFERRED EMBODIMENT.

Figure 1:
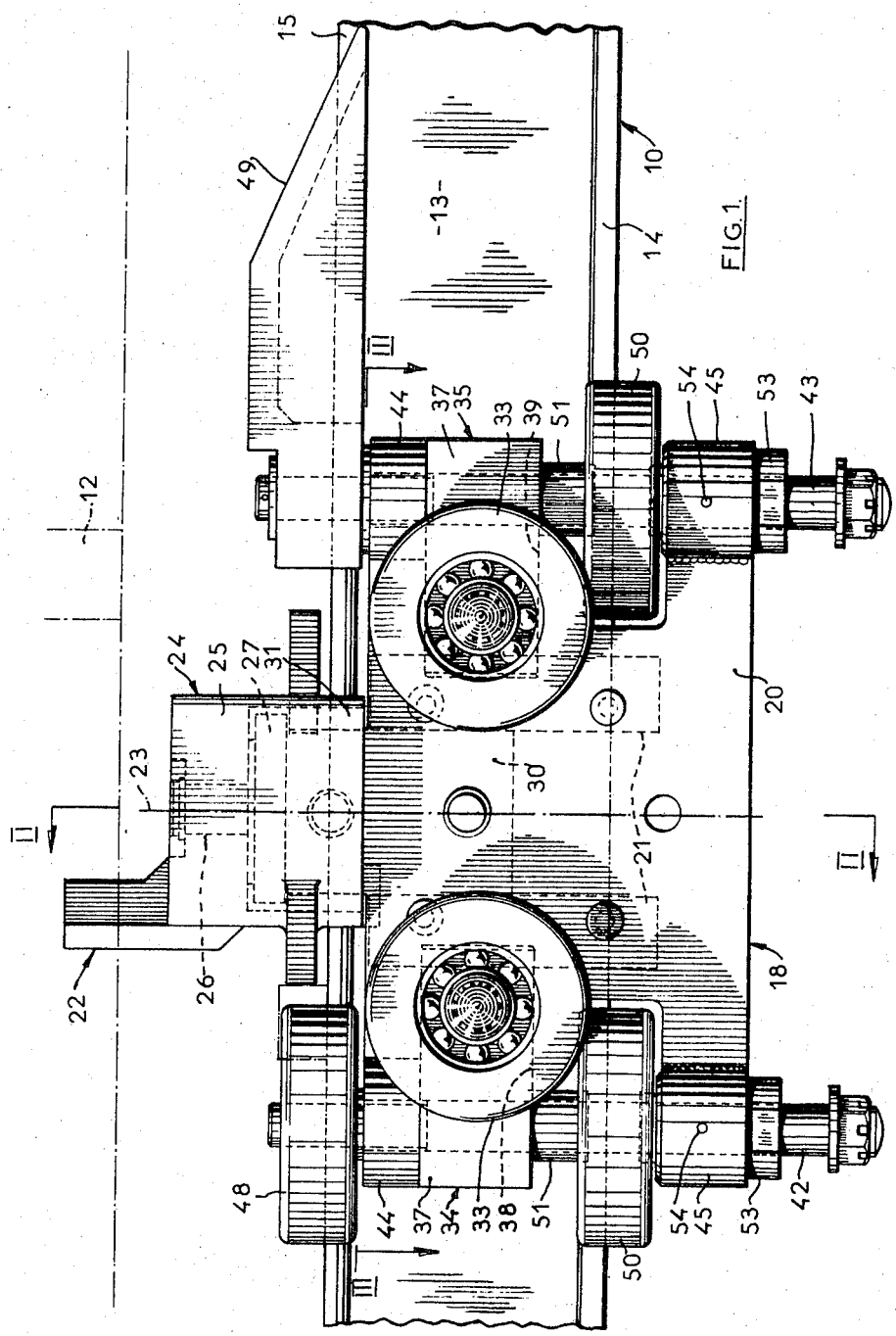
FIG. 1 shows in side elevation a trolley together with one portion of a track on which the trolley runs, a further, similar portion of the track being omitted.

The conveyor illustrated in the accompanying drawings includes a track having two portions, 10 and 11 respectively, which extend in side-by-side spaced relation. The conveyor further comprises a plurality of trolleys which run on the track, one only of these trolleys being illustrated, and a power element which is supported for movement along a path which extends above the track 10, 11 and which includes driving dogs, one of which is indicated in chain lines at 12 in FIG. 1.

Each of the track portions 10 and 11 is of channel shape in transverse cross-section and includes a vertical web 13, a lower generally horizontal flange 14 and an upper generally horizontal flange 15. The portions 10 and 11 are arranged with their open mouths facing towards each other. The lower flanges 14 are separated by a gap 16 and the upper flanges are separated by a gap 17.

The trolley illustrated in the accompanying drawings includes a body 18 comprising two plates 19 and 20 which are arranged parallel to and spaced on opposite sides of a medial plane of the trolley, which plane is normally vertical and extends lengthwise of the track when the trolley is engaged therewith. The plates 19 and 20 are spaced apart by and both riveted to spacer elements 21.

The trolley shown in the accompanying drawings is intended to be used as the trailing trolley of a train of trolleys running on the track, and is provided with an auxiliary driving dog 22 which projects upwardly from the body 18 towards the propelling element for engagement with the dogs 12 of the propelling element. The auxiliary driving dog 22 is intended to be operative only at times when a main driving dog, which would be provided on a leading trolley of the train, is inoperative. Accordingly, the driving dog 22 is mounted on the trolley for movement between an operative position in which it lies in the path of the power element dogs 12 and an inoperative position in which it is off-set from the path of the dogs 12. The dog 22 is shown in full lines in FIGS. 1 and 2 in its operative position and the inoperative position is indicated by chain lines at 22a in FIG. 2.

The driving dog 22 is arranged for pivotal movement between its operative and inoperative positions about a vertical axis 23. The dog is rigidly secured to and projects upwardly from a dog support 24 comprising an upper wall 25 which is of square shape, as viewed in plan. The upper wall 25 is formed with a central bearing opening in which a vertical pivot pin 26 is received. The pivot pin is secured to and projects upwardly from a horizontal plate 27 which lies beneath the upper wall 25 and provides a seat for the dog support 24. A thrust washer 28 is interposed between the horizontal plate 27 and the dog support 24 to reduce friction therebetween. The dog support is retained on the pivot pin 26 by means of a circlip 29. The horizontal plate 27 is secured to a vertical stem 30 which extends downwardly between the body plates 19 and 20, to which it is releasably secured by means of bolts.

Figure 2:
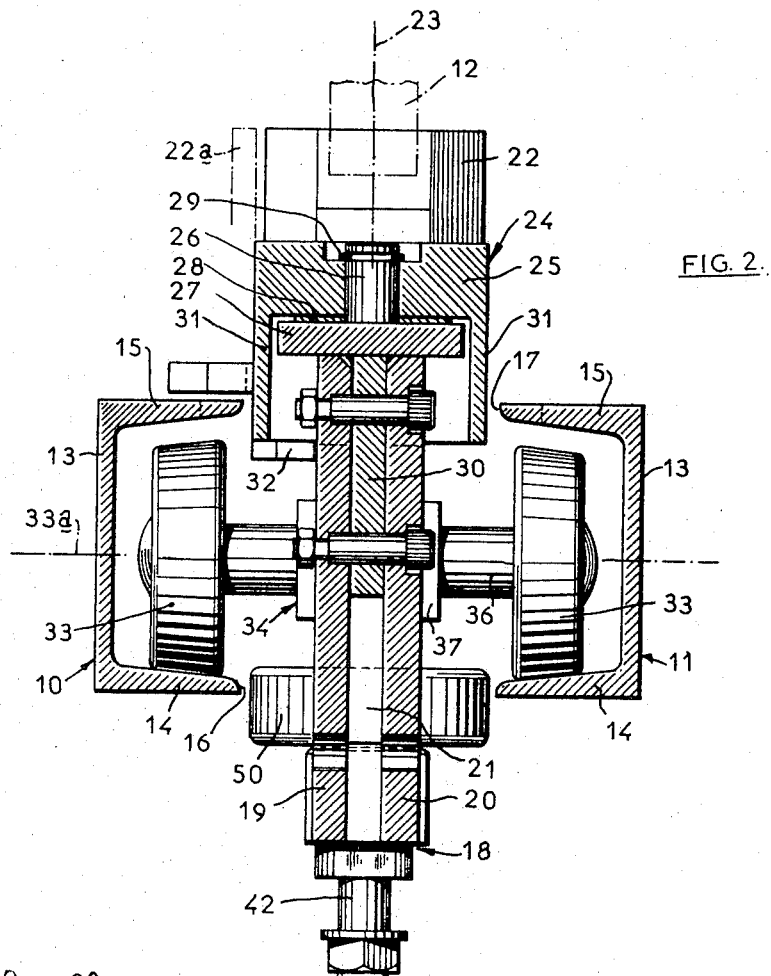
FIG. 2 shows the track and trolley in cross-section on the line II — II of FIG. 1.

The dog support 24 further includes a pair of lateral walls 31 which project downwardly from the upper wall 25 through the gap 16. The dimensions of the dog support 24 are such that, as shown in FIG. 2, a small clearance is normally provided between the lateral walls 31 and the upper flanges 15 of the track. In consequence of the square shape of the dog support, this small clearance is not sufficient to permit pivoting movement of the dog support about the axis 23. The auxiliary driving dog 22 is therefore normally held in one or other of its operative and inoperative positions.

Pivoting of the dog 22 relative to the body 18 of the trolley is limited to a range of approximately 90° by a stop 32 provided on one of the lateral walls 21. The stop 32 engages with the body of the trolley in each of the operative and inoperative positions of the driving dog to prevent pivoting movement beyond such position.

The trolley further comprises four load bearing wheels 33 which run on the lower flanges 14 of the track. As shown in FIG. 2, the wheels 33 are normally enclosed above, below and at their laterally outer sides by the channel section track portions 10 and 11. Front and rear pairs of the load bearing wheels 33 are carried on respective front and rear carrier members 34 and 35. Each of these carrier members comprises an axle 36 on opposite end portions of which an associated pair of load bearing wheels are mounted by means of suitable bearings. Each carrier member further comprises a cross head 37 in which the associated axle is secured.

Each of the cross heads 37 is adapted to cooperate with the body 18 of the trolley to guide the carrier members 34 and 35 for movement relative to the body in a direction transverse to the axes of the load bearing wheels to the assembled positions illustrated in the accompanying drawings. For this purpose, each of the plates 19 and 20 is formed with two open-ended horizontal slots 38 and 39, the open ends of which face forwardly and rearwardly of the trolley respectively. The slots 38 and 39 are dimensioned to receive the cross heads 37 with a sliding fit. The carrier members 34 and 35 are thus guided for sliding movement relative to the body in directions along the track.

Figure 3:
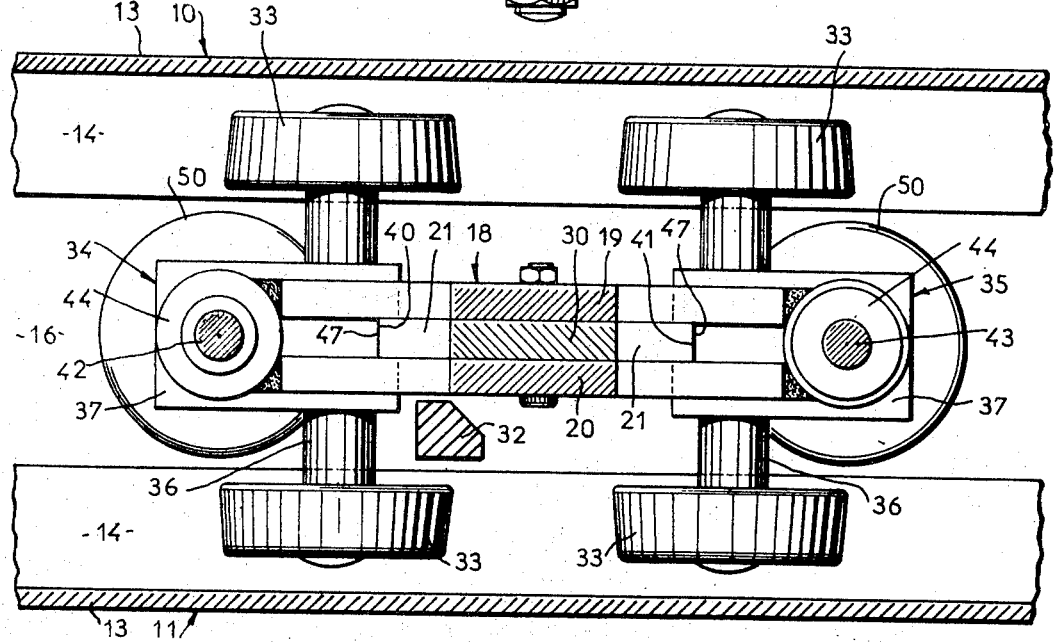
FIG. 3 shows the track and trolley in cross-section on the line III — III of FIG. 1.

As shown in FIG. 3, the cross head 37 of the front carrier member 34 is formed on its rearward face with a vertical slot 40 having a width equal to the width of the spacer elements 21. The cross head of the rear carrier member 35 is formed with a similar slot 41 in its forward face. When the carrier members are assembled with the body 18, the spacer elements 21 are received in the slots 40 and 41 of the cross heads. In this way, the carrier members are located in the transverse direction relative to the body.

Each of the cross heads 37 is also formed with a bore through which there extends a vertical spindle, 42 and 43 respectively. The spindle 42 also extends through upper and lower bosses 44 and 45 welded to the plates 19 and 20 at the forward end of the trolley. The spindle 43 extends through similar bosses 44 and 45 welded to the plates 19 and 20 at the rearward end of the trolley. It will be understood that when the spindles 42 and 43 are in the position illustrated, they retain the carrier members 34 and 35 in engagement with forwardly and rearwardly presented contact surfaces 46 and 47 of the spacer elements 21 respectively. Pivoting of the carrier members about the spindles 42 and 43 is prevented by engagement of the spacer elements in the slots 40 and 41.

The upper bosses 44 are formed with female screw threads and co-operating male threads are formed on appropriate portions of the spindles 42 and 43. An upper end portion of the spindle 42, which portion projects above the plates 19 and 20, carries a guide wheel 48 which is rotatable about a vertical axis and lies within the gap 17 defined between the upper flanges 15 of the track. The diameter of the guide wheel is such that it engages with only one of the track portions 10 and 11 at a time. On an upper end portion of the spindle 43 there is mounted an operating member 49 which projects rearwardly from the trolley for operating a driving dog of a leading trolley of a further train, when such leading trolley overtakes the trolley illustrated in the drawings. In a case where such an operating member is not required, a further guide wheel may be mounted on the upper end portion of the spindle 43.

A pair of lower guide wheels 50 are mounted one on each of the spindles 42 and 43 at positions immediately above the lower bosses 45. These lower guide wheels are rotatable about respective vertical axes and lie in the lower gap 16 defined between edge faces of the lower track flanges 14. Spacer sleeves 51 are fitted on the spindles 42 and 43 between the cross heads 37 and lower guide wheels 50. Portions of the spindles 42 and 43 which lie below the lower bosses 45 are formed with flats 53 to receive a spanner whereby the spindles can be screwed into and out of the upper bosses 44. During use of the trolley, rotation of the spindles is prevented by locking pins 54 which are inserted through cross bores formed in the lower bosses 45 into each of the spindles.

The carrier members 34 and 35, together with the load bearing wheels 33 carried thereon, can readily be disassembled from the body 18 and then withdrawn from the track. It will be noted that the locking pins 54 and the flats 53 formed on the spindles 42 and 43 are accessible below the lower flanges 14 of the track. Furthermore, circlips or other retaining elements by means of which the upper guide wheel 48 and the operating member 49 are retained on the spindles 42 and 43 respectively are readily accessible above the track. To remove a carrier member, the upper guide wheel or the operating member, as the case may be, is removed from its spindle, the locking pin 54 associated with that spindle is withdrawn and the spindle is unscrewed from its upper boss 44. The spindle is then withdrawn downwardly and removed. Once the spindle has been removed, the lower guide wheel 50 and adjacent spacer sleeve 51 can be removed by moving them away from the body in a direction along the track and then lowering them through the gap 16. The carrier member 34 or 35 is then freed for sliding movement relative to the body along the slots 38 or 39, i.e. in a direction forwardly or rearwardly along the track.

It will be noted from FIG. 2 that a substantial clearance space normally exists between each of the load bearing wheels 33 and the webs 13 of the track. Accordingly, when a carrier member 34 or 35 has been withdrawn clear of the body 18, such carrier member, with a pair of wheels 33 carried thereon, can be rotated about a vertical axis to bring the axis 33a of rotation of the load bearing wheels into parallel relation with a longitudinally extending axis of the track. It will further be noted from the drawings that the gap 16 between the lower flanges 14 of the track has a width greater than the diameter of the load bearing wheels 33. Accordingly, the carrier member with the wheels still mounted thereon can be lowered through the gap 16 and removed from the track. The load bearing wheels can then be serviced or replaced conveniently.

The load bearing wheels 33 and the guide wheels 48 and 50 typically have a diameter of 3¼ inches, and the gaps 16 and 17 are typically 3½ inches wide.

When one of the carrier members 34 and 35, together with the load bearing wheels 33 carried thereon, is removed from the body 18, the body will remain supported from the track by means of the other pair of load bearing wheels. If required, there may be provided on the trolley means disposed above the upper flanges 15 and extending laterally to overlap with these flanges so that such means will support the body from the track when both pairs of load bearing wheels 33 are removed.

It is claimed:

1. In a conveyor comprising a track having two channel section portions which extend side-by-side with their open mouths presented towards each other and a trolley having a body and a plurality of load bearing wheels which run inside the channel section portions of the track and support the body from the track, the improvement wherein:

the trolley comprises carrier means, the load bearing wheels are mounted on the carrier means for rotation relative thereto about respective axes, the body has a contact surface which faces outwardly from the body in a direction along the track and transverse to the axis of one of said load bearing wheels, the carrier means engages with said contact surface of the body, and releasable retaining means is provided for holding the carrier means in engagement with said surface of the body, whereby, when the retaining means is released, the carrier means can be withdrawn from the body in a direction parallel to the length of the track.

2. The improvement according to claim 1 wherein said retaining means is in the form of a spindle, the spindle is releasably mounted on the body and at least one guide wheel is mounted on the spindle for rotation about a guide wheel axis transverse to the length of the track and to the axis of said load bearing wheels.

3. In a conveyor comprising a track having two channel section portions which extend side-by-side with their open mouths presented towards each other and a trolley having a body and a plurality of load bearing wheels which run inside the channel section portions of the track and support the body from the track, the improvement wherein:

the trolley comrpises carrier means, the load bearing wheels are mounted on the carrier means for rotation relative thereto about respective axes, the body includes positioning means which defines a slot for receiving the carrier means and for guiding the carrier means in a direction parallel to the length of the track to a predetermined position relative to the body, said slot has an open mouth which faces along the track and releasable retaining means is provided for restraining movement of the carrier means from said predetermined position relative to the body and thereby retaining the carrier means in assembled relation with the body, whereby, when the retaining means is released, the carrier means can be disassembled from the body by movement relative thereto in a direction transverse to said axis.

4. The improvement according to claim 3 wherein the retaining means is in the form of a spindle, the spindle is releasably mounted on the body and at least one guide wheel is mounted on the spindle for rotation about a guide wheel axis transverse to the length of the track and to the axis of said load bearing wheels.

* * * * *